United States Patent [19]

Braatz et al.

[11] Patent Number: 5,431,817
[45] Date of Patent: Jul. 11, 1995

[54] BLEACH RESISTANT POLYSULFONE/POLYURETHANE COMPOSITE MEMBRANES

[75] Inventors: James A. Braatz, Beltsville; Denise A. Miller, Baltimore, both of Md.

[73] Assignee: W. R. Grace & Co.-Conn., New York, N.Y.

[21] Appl. No.: 121,001

[22] Filed: Sep. 13, 1993

[51] Int. Cl.⁶ ............................................. B01D 71/68
[52] U.S. Cl. .................................. 210/490; 210/500.41
[58] Field of Search ............. 210/500.41, 490, 500.23; 427/245, 246

[56] References Cited

U.S. PATENT DOCUMENTS

| | | |
|---|---|---|
| 4,230,463 | 10/1980 | Henis et al. . |
| 4,242,208 | 12/1980 | Kawaguchi et al. . |
| 4,273,661 | 6/1981 | Grey . |
| 4,787,976 | 12/1988 | Parham et al. . |
| 4,968,430 | 11/1990 | Hildenbrand et al. . |
| 4,990,252 | 2/1991 | Tomaschke et al. . |
| 5,075,011 | 12/1991 | Waite . |
| 5,096,585 | 3/1992 | Nguyen . |
| 5,173,300 | 12/1992 | Burleigh et al. .................... 424/445 |

*Primary Examiner*—Frank Spear
*Attorney, Agent, or Firm*—Bharat C. Gandhi; Beverly K. Johnson

[57] ABSTRACT

The resistance to an oxidizer of a biocompatible polysulfone membrane can be enhanced by the incorporation of a specific hydrophilic polyurethane polymer.

11 Claims, No Drawings

BLEACH RESISTANT POLYSULFONE/POLYURETHANE COMPOSITE MEMBRANES

FIELD OF THE INVENTION

This application relates to improved microporous and ultra-filtration polysulfone membranes. More specifically, it relates polysulfone membranes which incorporate certain protein resistant, hydrophilic polyurethane polymers. In addition to improving the biocompatibility of the polysulfone membrane, these polymers also exhibit greatly improved resistance to degradation by bleach.

BACKGROUND OF THE INVENTION

Polysulfone membranes are known in the art in both flat sheet and hollow fiber forms. These membranes have a wide variety of uses, including desalination by reverse osmosis, dialysis, and protein separations.

A major drawback of using membranes for concentration or fractionation of proteins in biotechnology downstream separation processes is the adsorption of protein molecule solutes on the membrane surface. This has an important impact on the flux decline, usually called "membrane fouling", and the performance characteristics of the membrane change with operating time. As a consequence, the separation process design becomes more difficult to optimize and sometimes requires complex operation modes. The easiest way to overcome this problem is to employ a protein non-adsorptive membrane.

Substantially protein non-adsorptive polysulfone microporous membranes are disclosed in U.S. Pat. No. 5,096,585, issued to Nguyen Mar. 17, 1992, and incorporated herein by reference as if set forth in full. Membranes made according to that reference have high burst strength, high flux and low protein adsorption characteristics suitable for applications to biotechnology, including dialysis. An added feature which would enhance the usefulness of these membranes would be reusability. Multiple hypochlorite (bleach) washes are used for cleaning such membranes and their associated equipment. Other oxidizers such as hydrogen peroxide and peracetic acid, or mixtures thereof, are also used. The membranes do not hold up well to such treatment. As a consequence, their use has thus far been limited to single applications or multiple applications where alternative protocols have been established. It has now been found that if such membranes are made by incorporating certain hydrophilic polymer formulations, the composite membranes exhibit enhanced resistance to bleach. Resistance to bleach is desirable as it extends the useable lifetime of the membranes.

OBJECTS OF THE INVENTION

It is therefore an object of this invention to prepare a substantially protein non-adsorptive polysulfone membrane which is also resistant to bleach.

It is also an object of this invention to provide such a membrane which is easily cleaned and disinfected for re-use.

These and other objects and advantages of the present invention will become apparent through the disclosure herein.

SUMMARY OF THE INVENTION

The objects and advantages of this invention are obtained by incorporating a specific type of hydrophilic polyurethane polymer into the polysulfone membrane to render the membrane both biocompatible and bleach resistant.

Certain hydrophilic polyurethane polymers have been shown to offer superior performance in a variety of applications in which protein adsorption is a critical phenomenon. These polymers, either in a hydrogel form or coated onto a surface, present a surface to an aqueous environment which is non-adsorptive to protein. In the area of membrane filtration, biological samples containing protein will quickly foul the membrane during the filtration process as a result of protein adsorption to the membrane surface. This causes an alteration of the filtration characteristics of the membrane as the bound proteins block the pores through which filtration occurs. Further adsorption of proteins to a surface in contact with blood is an early step in the generation of subsequent problems, such as the binding of cells which leads to thrombus formation, or activation of complement, leading to the formation of inflammatory peptide fragments. Thus, protein binding to membrane surfaces can lead not only to deterioration of membrane performance, but to serious adverse biological responses as well.

By incorporating biocompatible, i.e., protein resistant, hydrophilic polymers with polysulfone to form membranes in either a flat sheet or a hollow fiber configuration, the adsorption of protein is greatly reduced and the biocompatibility of the surface is improved. Some adsorption does eventually occur, and it would be desirable to remove the residual, adsorbed protein with an oxidizing agent such as bleach (sodium hypochlorite). Exposure to bleach solutions is detrimental to polyurethane polymers and these will degrade with a subsequent change in membrane properties. The inventors have found that a specific polyurethane polymer, HYPOL ® 6200 (available from Hampshire Chemical Corp.) is surprisingly resistant to bleach degradation either alone, or in combination with polysulfone polymers in a composite membrane formulation.

DETAILED DESCRIPTION OF THE INVENTION

The porous membranes of this invention are manufactured by a phase inversion process in a liquid-liquid precipitation scheme. This process involves the conversion of a liquid homogeneous polymer solution (casting solution) comprising a polysulfone polymer and a hydrophilic substantially protein non-adsorptive prepolymer into a solid, but flexible, porous fiber. The casting solution contains two or more polymers, one or more solvents for the polymer(s) and one or more non-solvents for the polymer(s). The non-solvent acts as a pore-former and hereafter the non-solvent used in the casting solution will be referred to as a pore-former or pore-forming agent or compound.

The casting solution is extruded directly into a liquid precipitation medium, where formation of the membrane occurs by phase inversion, that is, by precipitation of the polymeric component from the casting solution. This is referred to as liquid-liquid phase separation. In the case of hollow fiber formation, it may also be known as wet spinning. In that embodiment, the casting solution is fed through an extrusion die (spinnerette) directly into an outer precipitation solution, while simultaneously introducing a center precipitation solution through the central aperture of the spinnerette to mechanically maintain the hollow center hole of the fiber. Where formation of a flat sheet membrane is desired, the casting solution is cast directly into a precipitation solution, onto a flat support.

During the initial contact with the precipitation solutions, solvent and pore former are drawn from the casting solution. As a result, the polymer concentration increases and then causes precipitation of the polymer from the casting solution. The membrane continues to form as both solvent and pore-former are leached out and the polymer precipitates completely. The precipitation solution can contain a polymerization catalyst which is used to accelerate the polymerization of the prepolymer. During the membrane formation process, prepolymer leaches almost completely out of the membrane together with the pore-forming agent and the solvent into the coagulating solution. It is believed that when the prepolymer reaches the membrane surface, a small amount of prepolymer is polymerized upon contact with the catalyst at the membrane/coagulating solution interface; an interpenetrating polymer network is formed, and it is retained on the membrane surface. As a result, the membrane obtained has a strong wall structure coupled with hydrophilic, protein non-adsorptive surface. An alternative hypothesis is that the prepolymer is completely reacted, i.e., all the NCO has reacted, before the fiber spinning operation begins and the hydrophobic polymer migrates to the hydrophobic polymer/water interface and is trapped there during precipitation.

The factors influencing membrane porosity, pore size, membrane strength and overall morphology are exceedingly complex. A particular combination of these factors, i.e., casting solution, precipitation solution and spinning conditions, particularly the inclusion of substantially protein non-adsorptive prepolymers and catalysts, will yield a strong, protein non-adsorptive polysulfone microporous hollow fiber membrane. A specific selection of the non-adsorptive prepolymer will also yield enhanced resistance to bleach.

Casting Solution

As described above, the casting solution is a multi-component solution comprising polymeric, solvent and non-solvent (pore-forming) components. The primary polymeric components will be a polysulfone polymer (PS polymer") and a substantially protein non-adsorptive prepolymer. The polymeric component would, of course, also comprise any other polymer(s) or prepolymer(s) used together with the PS polymer and prepolymer to form the membranes. Where reference is made to the polysulfone solution or casting solution, it is intended to include all polymeric components. That is, it will include the polysulfone polymer, the protein non-adsorptive prepolymer, and, where appropriate, it also will include a selected additional polymer or prepolymer.

A. Polymeric Components a. Polysulfone

The membranes of this invention are polysulfone-based polymeric compositions. Polysulfone polymers including polyether sulfones and polyester sulfones are available in a variety of grades with respect to molecular weight, additives, etc. High molecular weight polysulfones may be preferred for preparation of membranes with additional strength. Udel TM 3500 and Udel TM 1700 polysulfone polymers (Amoco Performance Products Inc., Atlanta, Ga.) are suitable. Also suitable are polyether sulfones such as Victrex TM 5200 from ICI Americas, Inc., Wilmington, Del.; Ultrason 6010, from BASF, Parsippany, N.J., and the Radel TM A-100 and A-200 polymers from Amoco Performance Products, Inc., Atlanta, Ga. Polysulfone is used as the primary polymeric component of the membrane because of such beneficial characteristics as thermal stability, resistance to acid, alkali and salt solutions, high mechanical strength, etc.

b. Protein Non-Adsorptive Prepolymers

The substantially protein non-adsorptive prepolymers used in this invention are hydrophilic isocyanate end-capped polyurethane prepolymers.

These prepolymers are prepared using the well known prepolymer approach and can be made with polyoxyethylene containing diols and particular polyisocyanates. Crosslinking agents are also used to make the prepolymer.

The polyoxyethylene containing diols used are those having an average molecular weight, i.e. number average, of 2500 or less. The diol should also have at least 50%, preferably 80% and most preferably substantially 100% by weight, oxyethylene groups. A preferred diol is a polyoxyethylene diol from Union Carbide which has a molecular weight of between about 950 and 1050 and is commercially available as Carbowax 1000. However, other polyethylene glycol formulations having higher or lower molecular weights can also be used.

As mentioned earlier, when a diol such as Carbowax 1000 is used, a crosslinking agent is required to provide sufficient crosslinking and strength to the final polymer. Typical crosslinking agents include low molecular weight polyols having 3 or 4 hydroxyl equivalents per mole. Examples are trimethylolethane, trimethylolpropane, glycerol, triethanolamine, pentaerythritol or mixtures thereof. The preferred crosslinking agent is trimethylol propane (TMP). In general the molar ratio of diol to TMP should be in the range of about 1:1 to 4:1, with the preferred ratio being about 2:1 to 3:1. Of course, the higher the molecular weight diol used, the more crosslinker needed to get the proper crosslinking. By using the crosslinking agent in these proportions, sufficient hydroxyl equivalents are present for reaction with the isocyanate function groups of the polyisocyanates. Thus, the addition of the crosslinking agent to the diol and the polyisocyanate provides a prepolymer which has a number of branches and terminal isocyanates. The preferred isocyanate is methylene bis(4-cyclohexyl isocyanate) and is available as Desmodur ® W from Mobay Corp., Pittsburgh, Pa.

The polyol component, i.e. the diol and hydroxyl containing crosslinking agent, and the polyisocyanate component are preferably mixed at a ratio of about 1:1 by weight.

Catalysts can also be used to make the prepolymer. Examples include organotin compounds such as stannous octoate, stannous oleate, dibutyltin dilaurate, dibutyltin di-2-ethyl hexoate and the like. Tertiary amine catalysts such as triethyl amines may also be used. Such catalysts are disclosed in *Flexible Polyurethane Foams: Chemistry and Technology*; Woods, pp. 50–55, 1982, the contents of which are incorporated herein by reference. The amount of catalyst employed varies between 0.0005% and to about 0.1% by weight of catalyst to the weight of all components of the prepolymer, i.e. polyol, crosslinking agent and polyisocyanate.

The prepolymer is formed, using the above mentioned proportions, at a temperature in the range of 50° C. to about 90° C. and a residence time in the range of 0.5 to 48 hours, depending on the amount and type of catalyst used. Preferably the reaction is maintained at about 70° C. throughout the reaction.

Further, during the prepolymer forming reaction, it has been helpful to measure the isocyanate level by titration periodically during the reaction. From these periodic measurements, one can determine the theoretical point at which all the hydroxyl groups of the polyol (and crosslinking agent) will have reacted with an isocyanate. If the theoretical point has not been reached, additional reaction time will be required. However, if the reaction is carried out too far, the viscosity of the resulting prepolymer increases to the point where it becomes difficult to handle.

c. Other Polymers

Polysulfone alone is very hydrophobic. Addition of the isocyanate-capped polyurethane prepolymers and their derivatives results in membranes with increased resistance to nonspecific protein adsorption as well as enhanced biocompatibility.

Other polymers or prepolymers can be used in combination with the polysulfone polymer and protein non-adsorptive prepolymer, if desired, to impart various characteristics to the membrane product. Polyethylene glycol (PEG) or polyvinyl pyrrolidone (PVP) may additionally be used to prepare these membranes. Polymers or prepolymers such as these are added in order to modify the structure and surface characteristics of the membrane. The additional polymer or prepolymer becomes an integral part of the membrane structure.

B. The Solvent

The solvent component of the casting solution must be one in which polysulfone (as well as any other polymer or prepolymer used) is soluble. The polysulfone polymer is soluble in various solvents, such as N-methylpyrrolidone (NMP), dimethylformamide (DMF), N,N-dimethylacetamide (DMA), cyclohexanone, chloroform, and 4-butyrolactone. NMP is the preferred solvent.

At least about 8 wt % and up to about 35 wt % polysulfone in solvent should be used, preferably about 9 to about 25 wt %, more preferably 18 to 22 wt %. Above 35 wt %, it will be difficult or impossible to dissolve the polysulfone in the solvent. Below about 8 wt %, the precipitation rate will be too slow for formation of hollow fibers. The substantially protein non-adsorptive prepolymer should be present in the casting solution in an amount of about 1 wt % to about 20 wt %, preferably about 5 to 10 wt %. Up to about 20 wt % of a third polymeric component, that is, one or more of the polymers or prepolymers described above, can be added to the casting solution.

C. The Pore-Forming Component

Selection of the pore-forming component is very important for the ultimate characteristics of the membrane. Pore formation will vary depending on the interaction between the non-solvent (pore-former) and the other components of the casting solution, as well as the solubility of the pore-former in the precipitation solution, etc. The selection of the pore-forming agent will affect casting solution viscosity and rate of casting solution precipitation, as well as membrane porosity, permeability and morphology. The pore-forming component must be soluble in the precipitation solution used in the membrane formation process.

The polymer or prepolymer component which may be added in conjunction with the polysulfone could be considered a non-solvent in that it will not dissolve the polysulfone. However, although this component may partially leach out of the membrane, it does not completely leach out as do the precipitation medium-soluble non-solvents (pore-formers) listed below.

Generally, the pore-forming component can be selected from alkanols, polyols, polyglycols, cycloketones or combinations thereof. Specific, but non-limiting, examples include methanol, t-butanol, acetone, cyclododecanone, 4-hydroxybutyric acid and polyethylene glycol (PEG). The quantity used will vary and can be determined for each pore-forming composition by routine optimization. For low molecular weight pore-formers, it will be preferred to use larger quantities in the casting solution. Where high molecular weight pore-formers are used, such as high molecular weight PEG, they may not completely leach out of the membrane during normal processing.

Precipitation Solution

The precipitation or coagulation mechanism of membrane formation is affected by the composition of the precipitation solution as well as that of the casting solution, and the compositions of these two solutions are interdependent. In this disclosure, the terms "precipitation solution," "coagulation solution," "quench solution" and "quench bath" are used interchangeably to refer to the solution in which the membrane is formed. For formation of hollow fiber membranes, both an outer and a center precipitation or quench solution will be employed. The precipitation solution can be made up of three components: solvent, non-solvent and swelling agent. Additionally, the center precipitation solution, and possibly the outer precipitation solution, can contain a catalyst. Together, these components control the rate of membrane precipitation as well as the membrane characteristics, resulting in formation of the membrane of this invention.

A. The Solvent

The solvent content of the precipitation solution controls the rate at which the solvent comes out of the casting solution. In turn, this controls the rate of increase of the polymer concentration to the point at which the polymeric component precipitates out of the casting solution to form the membrane. If used, the same solvent usually is in both the casting solution and the precipitation solution. NMP is the preferred solvent. Other solvents are discussed above with regard to casting solutions.

B. The Non-Solvent

A non-solvent is used in the precipitation solution in order to precipitate the polymer and prepolymer from the casting solution, thus causing formation of the membrane. For practical and economical purposes, it is preferred to use water as the non-solvent component of the precipitation solution. However, other non-solvents such as methanol, ethanol, propanol, butanol, ethylene glycol, acetone, methyl ethyl ketone, or the like, as listed above, can be used in conjunction with water, particularly when the solvent is water-immiscible.

C. The Swelling Agent

The presence of a swelling agent in the precipitation solution also serves to control the polymer and prepolymer precipitation rates. This component swells, but does not dissolve the polymer or prepolymer, thus slowing the rate of polymer precipitation. In addition, the presence of the swelling agent acts to favor the introduction of the precipitation medium into the casting solution, in exchange for the pore-former and solvent, resulting in the formation of a membrane with a high porosity. If used, the preferred swelling agent is ethanol or isopropyl alcohol (IPA). Alternatively, other components, or combinations thereof, can be used as the swelling agent. Triethylene glycol, nitrobenzene, tetrahydrofuran, dioxane, dimethyl carbonate, dimethyl sulfone, diethyl phosphate and dimethyl sulfoxide may be used as swelling agents.

D. The Catalyst

The presence of a catalyst in the precipitation solution can serve to accelerate the polymerization of the prepolymer. Most of the prepolymer leaches out of the membrane with the pore-former and solvent. However, when the polymerization catalyst is present in the coagulation solution, a small amount of prepolymer is polymerized upon contact with the catalyst at the interface between the membrane and coagulating solution. During this process, an interpenetrating network between the polysulfone and the polymerized prepolymer is formed. The membrane has a characteristic strong wall structure and hydrophilic, protein non-adsorptive surface. Numerous catalysts known in the art can be used for this application. The preferred catalysts are water-soluble salts consisting of a monovalent cation of the alkali metal family or a divalent cation of the alkaline-earth metal family and an anion. Monovalent cations can be lithium, sodium, potassium, and cesium. Divalent cations can be calcium, strontium, barium, and magnesium. The anion can be carbonate, bicarbonate, borate, phosphate, nitrate, silicate, aluminate, and hydroxide. The most preferred catalysts include sodium bicarbonate, sodium nitrate, and sodium borate. Catalyst mixtures can also be used.

In one embodiment of this invention, the precipitation solution is made up of N-methylpyrrolidone (NMP) as the solvent, ethanol or isopropanol as the swelling agent, water as the non-solvent, and sodium bicarbonate as the catalyst. About 10 to 70 wt % NMP is used, preferably about 40 to 70 wt %, most preferably about 50 to 70 wt %. About 10 to 80 wt % ethanol or isopropanol is used, preferably about 15 to 40 wt %. About 5 to 40 wt % water is used, preferably about 10 to 30 wt %. About 0.01 to 1.0 wt % sodium bicarbonate is used, preferably about 0.05 to 0.2 wt %. Where other solvents, swelling agents, or catalysts are substituted for these preferred components, these general ranges will still be applicable.

Hollow Fiber Spinning Conditions

In preparing hollow fiber membranes of this invention, a liquid-liquid or wet spinning process is used. That is, the casting solution is fed through an extrusion die (spinnerette) directly into a precipitation bath, while simultaneously introducing the center quench fluid through the central aperture of the spinnerette to mechanically maintain the hollow center hole of the fiber. The fiber is fabricated and simultaneously quenched as it is drawn through the precipitation bath. By using this wet-spinning process, fibers with homogeneous pore structure and membrane morphology are produced.

One of the key factors in preparation of the hollow fiber membranes of this invention is use of the wet spinning process, that is, spinning the casting solution directly into the precipitation solution or bath. Wet spinning is also necessary since the catalyst is in the precipitation solution. It is important that the casting solution interact with the precipitation solution containing the catalyst in order to form the strong wall which is characteristic of this invention. In addition, selection of appropriate solutions for the inner and outer precipitation baths is important, as is the appropriate drawing or spinning rate of the fiber as it is formed. The presence of the center quench fluid also allows for simultaneous polymer precipitation from both the inner and outer surfaces of the fiber. The spinning rate is adjusted to allow for exchange of components between the casting and precipitation solutions. The solvent and pore-forming agent are leached out of the casting solution and are replaced by the non-solvent and swelling agent from the precipitation solution. As a consequence, polymer precipitation occurs, leading to formation of the membrane.

Too rapid a drawing rate will cause breakage due to insufficient membrane formation to maintain membrane integrity or will cause elongation or deformation of the pores. Conversely, too slow a drawing rate will not be cost effective. The preferred drawing rate will depend in part on the casting solution viscosity and temperature and in part on the factors described below.

In utilizing the method of this invention to prepare hollow fiber membranes, the precipitation solution used for the outer quench bath preferably is different from that used for the center quench fluid, although the two can be the same. It probably will be preferred to utilize different solutions in order to more precisely control the phase inversion rate so that a symmetric (isotropic) membrane is produced. In hollow fiber production, the center quench and outer quench are different phenomena. At center quench, a small volume of solution is used, which is almost in a static mode as compared with the casting solution.

Conversely, the outer quench bath is present in large volumes and in a dynamic mode. By controlling the solvent content of the two quench solutions, the phase inversion rate is controlled so as to produce an isotropic membrane. Solvent diffusion out of the casting solution will occur at a different rate at the inner and outer surfaces if the same precipitation solution is used. By adjusting the solvent and swelling agent content of the two solutions, the precipitation (or phase inversion) rate will be equilibrated, resulting in an isotropic membrane.

The presence of the catalyst in the center quench solution enables the preparation of a hollow fiber membrane having a protein non-adsorptive inner surface. It is possible to have the catalyst in either the center or outer solution or both.

The precise spinning conditions are adjusted in order to yield hollow fibers meeting the desired physical requirements of inner diameter and wall thickness. Centering of the central aperture of the spinnerette is required in order to achieve a fiber having a uniform wall thickness. Any spinnerette suitable for the preparation of hollow fiber membranes may be used to prepare the membranes of this invention. The spinning conditions left to be adjusted are the flow rate and pressure of the casting solution, and the flow rate and pressure of the center quench fluid. These adjustments are well within the knowledge and ability of one of ordinary skill in this art. The preferred temperature for the casting solution will be in the range of ambient temperatures, although higher temperatures, e.g., up to about 70° C., may be employed to reduce the viscosity of the casting solution.

The dimensional and porosity characteristics of the membranes of this invention will depend on the desired end use as well as the various factors discussed above with respect to membrane preparation. Generally speaking, membranes can be prepared which possess a pore diameter of between about 0.002 microns and about 10 microns. The inner diameter of the hollow fibers can range from about 100 to several thousand microns. The wall thickness can range from about ten to several hundred microns.

Following the quench bath, the hollow fiber is washed in water to remove residual solvents, non-solvents and swelling agents. Standard hollow fiber water wash procedures are used. It may be desired to treat the hollow fiber membranes with a humectant, such as glycerine, or a surfactant to improve membrane wettability. For example, the fibers may be soaked overnight in a 10–30% (vol/vol) glycerine bath. This step is optional. The fibers are then dried and prepared for use. The fibers may, for example, be bundled and potted in a cartridge.

The protein non-adsorptive polysulfone-based hollow fiber membranes of this invention will find utility in industrial or pharmaceutical filtration and fractionation processes. These membranes exhibit good tensile strength, high flux, low fouling properties and very low protein adsorption. Membranes can be prepared which exhibit high rejection of high molecular weight species and low rejection of lower molecular weight species.

The membranes of this invention are excellently suited for many biotechnology applications including dialysis and plasmapheresis. The membranes are equally well suited for immobilization of enzymes or other reactive agents due to their high surface area and high flux. The fibers can thus be used in immobilization reactors, diagnostic kits, etc. The membranes of this invention may also be used for cell culture, either for fermentation reactions or in artificial organs, or the like.

Preparation of Flat Sheet Membranes

Either supported or non-supported isotropic flat sheet membranes can be made by the method of this invention. That is, the flat membranes can be prepared either with or without an integral supporting material. If an integral support is used, it preferably will be a nonwoven polyester or polypropylene material, although other supports may be used. Non-supported, or self-supported, flat sheet membranes can be fabricated by casting the casting solution directly onto a nonporous surface such as glass, stainless steel, or the like.

For either type, the casting solution is cast onto a rigid nonporous support, such as glass or stainless steel. Where supported membranes are prepared, the nonporous support is covered with a reinforcement material (e.g., nonwoven polyester) which will become an integral support. Since the membrane is supported during precipitation, precipitation can be at a slower rate than the hollow fiber membranes described above. This affords greater flexibility in preparing the casting and precipitation solutions. However, the guidelines given above will apply generally to flat sheet membrane formation as well.

Membrane casting may be with a casting knife, and membranes may be cast onto the support at the desired thickness (i.e., 2.0 to 15.0 mils, preferably 4.0 to 10.0 mils). The membrane is cast onto the support directly in the precipitation bath, without exposure to air. When membrane formation is complete, the membrane separates from the nonporous support. However, if reinforcement material is used, it becomes an integral part of the membrane.

The membrane is water washed to remove residual solvents, non-solvents, and swelling agents. Standard water wash procedures are used. It may be desired to treat the membrane with glycerin or a surfactant to improve membrane wettability. For example, the membrane optionally may be soaked in a 10–30% (vol/vol) glycerin bath. The membrane is then dried and prepared for use.

The following examples illustrate the use of the present invention without limiting its scope, or the scope of the claims which follow.

Preparation of Prepolymer A

A prepolymer was prepared by mixing 848.8 g of deionized and dried BASF ® 1123 polyol, a 6800 MW polyether triol comprised of 75% ethylene oxide and 25% propylene oxide. (BASF, Wyandotte Corp, Wyandotte, Mich.) with 91.6 g isophorone diisocyanate (IPDI) in a one liter polyethylene bottle at room temperature with mechanical stirring for 30 minutes. Dry nitrogen was purged over the mix and the bottle was sealed with a screw cap and placed in an electric oven at 125° C. After 2 days the reaction was terminated. The product had an isocyanate value of 0.43 meq/g and a viscosity of 62,000 cps at 25° C. This prepolymer was designated Prepolymer A.

Preparation of Prepolymer B

A mixture of 500 g (0.5 moles) of Carbowax 1000 and 33.5 g (0.25 moles) of trimethylolpropane was degassed by heating for two hours @70° C. and about 2 Torr. To this was added 542 g (2.07 moles, 18% excess) of Desmodur W, i.e. methylene bis(4,4'-cyclohexyl isocyanate). The temperature was raised to 70° C. and 0.5 g of stannous octoate was added as catalyst. After 35 minutes, the isocyanate content of the reaction product was 2.19 meq/g and the product was poured into a bottle for storage. After a few days at ambient temperature, the isocyanate content and viscosity had stabilized at 2.00 meq/g and 73,000 cp at 25° C.

Preparation of Prepolymer C

A prepolymer was prepared by admixing 2 molar equivalents of polyethylene glycol having an average molecular weight of 1,000 (PEG-1,000) and one molar equivalent of trimethylolpropane (TMOP). the admixture was dried at 100°–110° C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred because of crosslinking of the polyols with TDI.

EXAMPLE 1

Preparation of Polysulfone Composite Flat Sheet Membranes

Composite or single polymer component control membranes were cast in a flat sheet configuration according to the following formulation:

| Membrane | Polysulfone | Polyurethane Prepolymer A | Polyurethane Prepolymer B | PEG 600 | NMP |
|---|---|---|---|---|---|
| 1 | 21% | None | None | 36% | 43% |
| 2 | 21% | 10% | None | 26% | 43% |
| 3 | 21% | None | 10% | 26% | 43% |

The polysulfone (Udel ® 3500 available from Amoco Performance Products, Inc., Atlanta, Ga.) and PEG 600 from Dow Corning, Midland, Mich., were mixed with the NMP on a roller mill until completely dissolved. Flat sheet membranes approximately 7 mils thick were cast by water precipitation on Texlon ® from Texlon Corporation, Ventura, Calif. backing with the aid of a small flat sheet casting machine. The membranes were washed with water at 65° C. for 5 hours twice, then stored in water.

EXAMPLE 2

Evaluation of Bleach-Treated Polysulfone Composite Membranes

Membranes were treated with bleach for 1 or 24 hours at room temperature by immersion in a 1:20 dilution of Clorox Bleach from The Clorox Company, Oakland, Calif., (5.25% sodium hypochlorite) in water, followed by thorough rinsing with water. Water flux measurements were performed in an Amicon Ultrafiltration Cell from Amicon Division, W. R. Grace & Co., Beverly, Mass., using nitrogen pressure at 5 psi. Protein adsorption to the membranes was determined by concentrating 50 ml of a solution of cytochrome C from Sigma Chemical Company, St. Louis, Mo., at 0.1 mg/ml down to 10 ml in the ultrafiltration cell. A visual assessment of the adsorbed protein was made by scoring the extent of red coloration on the membrane on a scale from "−", which represents no protein adsorption to "++++", which represents extensive adsorption. Results obtained were as follows:

| Membrane # | Treatment | Water Flux ml/min @ 5 psi | Cytochrome C adsorption |
|---|---|---|---|
| 1 | None | 9.7 | ++ |
| 1 | Bleach (24 Hr) | 11.4 | ++++ |
| 2 | None | 0.4 | − |
| 2 | Bleach (24 Hr) | 3.0 | + |
| 3 | None | 3.9 | − |
| 3 | Bleach (24 Hr) | 3.5 | − |

This example demonstrates the resistance of the polyurethane component Prepolymer B of the composite membrane (No. 3) to bleach degradation. The control polyurethane-containing membrane (#2) is degraded by bleach as evidenced by an increase in the water flux and in the protein adsorption. The experimental membrane (#3) shows no change in either test parameter as a result of bleach treatment.

EXAMPLE 3

Preparation of Polyarylsulfone Composite Flat Sheet Membranes

Flat sheet membranes were prepared as in Example 1 but using polyarylsulfone (Radel A-100 from Amoco Performance Products, Inc., Atlanta, Ga.) according to the following formulation.

| Membrane # (Code) | Polyarylsulfone | Polyurethane Prepolymer B | Polyurethane Prepolymer C | PEG 600 | NMP |
|---|---|---|---|---|---|
| 4 | 20% | None | None | 36% | 44% |
| 5 | 20% | None | 10% | 36% | 34% |
| 6 | 20% | None | None | 36% | 44% |
| 7 | 20% | None | 10% | 36% | 34% |
| 8 | 20% | 10% | None | 36% | 34% |

Membranes #4 and 5 were cast on TEXLON backing. Membranes #6-8 were cast on Hollytex backing from Filtration Science, Mt. Holly Springs, PA.

EXAMPLE 4

Evaluation of Bleach-Treated Polyarylsulfone Composite Membranes

Membranes were treated and evaluated as described in Example 2. In addition, after the bleach treatment each membrane was treated with concentrated formaldehyde solution at room temperature for 3 days then subjected to bleach treatments for 1 and 24 hours. The effects of these treatments on membrane performance are listed below.

| Membrane # | Treatment | Water Flux ml/min @ 5 psi | Cytochrome C adsorption |
|---|---|---|---|
| 4 | None | 10.98 | (++++) |
| 4 | Bleach (24 Hr) | 12.91 | (++++) |
| 4 | formaldehyde | 6.63 | (++++) |
| 4 | formaldehyde + 1 hr bleach | 10.37 | (++++) |
| 4 | formaldehyde + 24 hr bleach | 11.88 | (++++) |
| 5 | None | 5.79 | (−) |
| 5 | Bleach (24 Hr) | 13.96 | (+) |
| 5 | formaldehyde | 8.12 | (−) |
| 5 | formaldehyde + 1 hr bleach | 10.79 | (+/−) |
| 5 | formaldehyde + 24 hr bleach | 10.68 | (++++) |
| 6 | None | 4.76 | (++++) |
| 6 | Bleach (24 xr) | 6.23 | (++++) |
| 6 | formaldehyde | 3.95 | (++++) |
| 6 | formaldehyde + 1 hr bleach | 3.96 | (++++) |
| 6 | formaldehyde + 24 hr bleach | 4.14 | (++++) |
| 7 | None | 1.33 | (−) |
| 7 | Bleach (24 Hr) | 3.05 | (+) |
| 7 | formaldehyde | 1.91 | (−) |
| 7 | formaldehyde + 1 hr bleach | 2.68 | (++) |
| 7 | formaldehyde + 24 hr bleach | 2.55 | (++++) |
| 8 | None | 3.04 | (−) |
| 8 | Bleach (24 Hr) | 3.70 | (−) |
| 8 | formaldehyde | 2.70 | (−) |
| 8 | formaldehyde + 1 hr bleach | 3.07 | (+/−) |
| 8 | formaldehyde + 24 hr bleach | 3.16 | (++) |

This example demonstrates the resistance of the Prepolymer B component of the composite membranes to bleach degradation. Membranes cast with this polyurethane component (#8) resist bleach attack as evidenced by water flux and protein adsorption measurement. Other polyurethane composite membranes (#5 and 7) increase their water flux and protein retention after bleach.

EXAMPLE 5

Degradation of Polyurethane Polymers by Bleach

To further evaluate the susceptibility of the polyurethane polymers used here to the effects of bleach, each isocyanate-containing prepolymer was reacted with water to form a foam or a hydrogel. The polymers were dried, then weighed portions were completely hydrated with water and placed in solutions of bleach and kept at room temperature. The bleach solutions were either diluted 1:20 with water, or used full strength. Degradation of polymer was determined by measuring their weight loss as a function of time. The results are listed below.

| A. Using bleach diluted 1:20 with water: | | | |
|---|---|---|---|
| | Weight Remaining, % of Initial Using Prepolymer | | |
| Hours in Bleach | A | B | C |
| 0 | 100 | 100 | 100 |
| 1 | 95 | 98 | 98 |
| 5 | 98 | 100 | 88 |
| 22 | 100 | 100 | 81 |
| 46 | 100 | 100 | 76 |
| 70 | 3 | 100 | 71 |
| 94 | 0 | 100 | 69 |
| 166 | 0 | 100 | 66 |
| 214 | 0 | 100 | 62 |
| 262 | 0 | 100 | 60 |
| 358 | 0 | 100 | 56 |
| 430 | 0 | 100 | 53 |
| 502 | 0 | 100 | 49 |
| 598 | 0 | 100 | 43 |
| 694 | 0 | 100 | 39 |

| B. Using Undiluted Bleach: | | | |
|---|---|---|---|
| | Weight Remaining, % of Initial Using Prepolymer | | |
| Hours in Bleach | A | B | C |
| 0 | 100 | 100 | 100 |
| 1 | 70 | 100 | 57 |
| 2 | 63 | 100 | 32 |
| 3 | 53 | 100 | 24 |
| 24 | 3 | 100 | 5 |
| 48 | 0 | 100 | 0 |
| 120 | 0 | 100 | 0 |
| 216 | 0 | 94 | 0 |
| 312 | 0 | 64 | 0 |

It is clear from these data that both Prepolymers B and C show enhanced resistance to diluted bleach, and that B is especially resistant to undiluted bleach.

What is claimed is:

1. A substantially protein non-adsorptive polysulfone membrane having enhanced resistance to an oxidizer comprising:
   (a) a polysulfone polymer;
   (b) a polyurethane polymer prepared by reacting water with a prepolymer prepared from
      (i) a polyoxyethylene containing diol consisting essentially of polyoxyethylene, having a molecular weight of about 2500 or less, and containing at least about 50% by weight of oxyethylene units;
      (ii) a crosslinking agent comprising a low molecular weight polyol having 3 or 4 hydroxyl equivalents per mole; and
      (iii) methylene bis (4,4'cyclohexyl isocyanate); and
   (c) a pore-forming agent.

2. The membrane of claim 1 wherein the diol contains at least 80% by weight polyoxyethylene.

3. The membrane of claim 1 wherein the diol contains substantially 100% by weight polyoxyethylene.

4. The membrane of claim 1 wherein the crosslinking agent is trimethylol propane.

5. The membrane of claim 1 further comprising polyethylene glycol.

6. The membrane of claim 1 in which said pore-forming component is selected from alkanols, polyols, polyglycols or cycloketones.

7. The membrane of claim 1 in which said pore-forming component is methanol, t-butanol, acetone, cyclododecanone, 4-hydroxybutyric acid or polyethylene glycol.

8. The membrane of claim 1 further comprising a non-solvent for polysulfone which comprises water, methanol, ethanol, propanol, butanol, ethylene glycol, acetone or methyl ethyl ketone.

9. The membrane of claim 1, which is a microporous or ultrafiltration polysulfone hollow fiber membrane.

10. The membrane of claim 1, wherein the oxidizer is hydrogen peroxide, peracetic acid, sodium hypochlorite, or mixtures thereof.

11. A method of improving the oxidative degradation resistance of a substantially protein non-adsorptive polysulfone membrane, by incorporating into the membrane a prepolymer prepared from
   (i) a polyoxyethylene containing diol consisting essentially of polyoxyethylene, having a molecular weight of about 2500 or less, and containing at least about 50% by weight of oxyethylene units;
   (ii) a crosslinking agent comprising a low molecular weight polyol having 3 or 4 hydroxyl equivalents per mole; and
   (iii) methylene bis(4,4'cyclohexyl isocyanate), and reacting said prepolymer with water to form a polyurethane polymer.

* * * * *